May 22, 1934.  E. LANGENHAGEN ET AL  1,959,538
PRISMATIC TELESCOPE WITH RIGHT ANGLED ISOSCELES REFLECTING PRISMS
Filed Aug. 12, 1932

Inventors:
Ernst Langenhagen
Robert Meehan

Patented May 22, 1934

1,959,538

UNITED STATES PATENT OFFICE 1,959,538

PRISMATIC TELESCOPE WITH RIGHT-ANGLED ISOSCELES REFLECTING PRISMS

Ernst Langenhagen and Robert Mechau, Jena, Germany, assignor to the firm Carl Zeiss, Jena, Germany Application August 12, 1932, Serial No. 628,556
In Germany August 17, 1931

5 Claims. (Cl. 88—33)

The invention concerns a prismatic telescope with right-angled isosceles reflecting prisms which are so fixed in the telescope that their hypotenuse surfaces are pressed against a seat (for instance by a spring). Hitherto, this seat has been constructed in such a manner that the whole of the hypotenuse surface of the prism rests on a plane surface. It has been proved, however, that this kind of prism support gives rise to tensions in the prism. When working the seat in the usual manner, its support surface will not be exactly plane but slightly vaulted (hollow), which means that the hypotenuse surface of the prism is supported only at two ends. As a consequence, when pressed against its seat, the prism has to suffer the said tensions.

The invention aims at avoiding these tensions by so supporting the prism that only that part of its hypotenuse surface which lies in the middle between the two reflecting surfaces rests against the prism seat.

A support of this kind is attained for instance by so constructing the prism seat that that part of this seat against which the hypotenuse surface rests has an elevation. This elevation is obtained for instance by suitably working the prism seat. A vaulted form of the seat surface will especially answer the purpose.

If it is desired to work the seat in the same manner as hitherto, that is to say by aiming at a plane support surface (which, as said above, is however not attained completely), an elevation for avoiding the tensions in the prism may be provided either by placing a special body, for instance a tinfoil plate, on the prism seat or by providing a recess in the hypotenuse surface in the middle between the two reflecting surfaces and placing in this recess a body, preferably a wire of such thickness that the prism lies against this body.

The prism may be supported in a very convenient manner in the sense of the invention also by elevating part of it, thus dispensing with auxiliary means.

Figure 1:
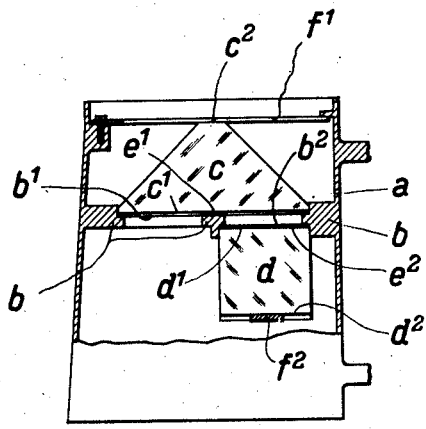
Figure 3:
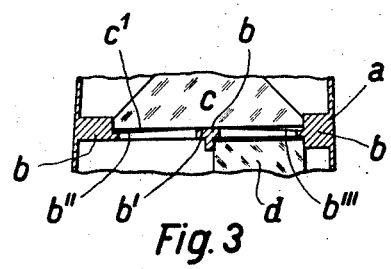
Figure 4:
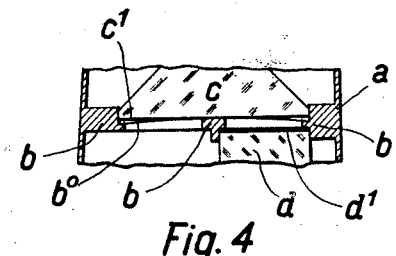
Figure 2:
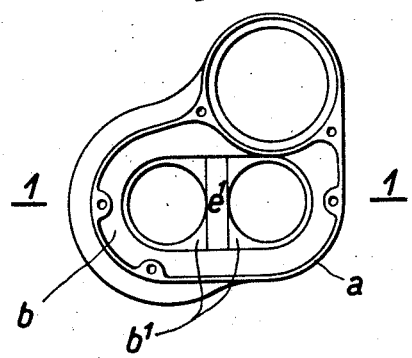
Figure 5:
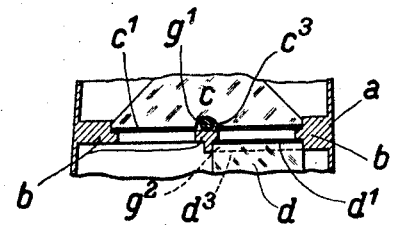
Figure 6:
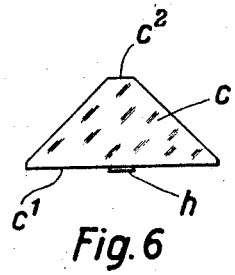

The accompanying drawing illustrates five constructional examples of the invention. Figures 1 and 2 represent, partly in a section, partly in elevation, and partly in a plan view, part of a prismatic binocular telescope with Porro prisms. In these two figures, the lens members as well as the caps are left away. In Figure 2 also the prisms are not shown. Figures 3, 4 and 5 represent partial sections in elevation of three other constructional forms of a telescope of the said kind. Figure 6 represents a reflecting prism altered for the purposes of the present invention.

In Figures 1 and 2, $a$ is a telescope tube the seat $b$ of which supports two Porro prisms $c$ and $d$. The support surfaces $b^1$ and $b^2$ held by the seat $b$ are plane. In the middle of these support surfaces are fixed tinfoil plates $e^1$ and $e^2$, respectively, against which the prisms $c$ and $d$ lie with those parts of their hypotenuse surfaces $c^1$ and $d^1$, respectively, which are opposite the truncating surfaces $c^2$ and $d^2$ in the direction of the pressure exerted upon the prisms by springs $f^1$ and $f^2$ when these prisms are fixed in the tube.

The constructional form according to Figure 3 differs from those according to Figures 1 and 2 only by the fact that each support surface consists of three plane parts the central part $b'$ of which is parallel to the hypotenuse surface of the appertaining prism, and that the two lateral parts $b''$ and $b'''$ and the respective hypotenuse surfaces embrace angles. In this constructional form, each prism rests only against the middle part $b'$ of the support surface.

In the constructional form according to Figure 4, each support surface is vaulted and this in such a way that only the central part of the vault supports the appertaining prism.

In the constructional form according to Figure 5 use is made of prisms $c$ and $d$ whose hypotenuse surfaces $c^1$ and $d^1$, respectively, have recesses $c^3$ and $d^3$, respectively, in their middle parts. In these recesses are disposed wires $g^1$ and $g^2$, respectively, these wires transmitting to the prism seat $b$ the pressure exerted upon the prisms fixed in the tube $a$.

The prism $c$ according to Figure 6 is to be placed on a plane seat, for instance as illustrated in Figure 5. This prism $c$ has a glass plate $h$ cemented to that part of its hypotenuse surface $c^1$ which is opposite the truncating surface $c^3$ in the direction of the pressure exerted upon the prism fixed in the telescope tube. The prism and the plate $h$ may be integral.

We claim:

1. A prismatic telescope, comprising two telescope tubes, right-angled isosceles reflecting prisms, each reflecting prism resting against a supporting part of the appertaining tube only with that part of its hypotenuse surface which lies in the middle between its two reflecting surfaces, and means for pressing the prism against the tube, these means acting only against that part of the prism which is adjacent to the line of intersection of the two reflecting surfaces.

2. A prismatic telescope, comprising two telescope tubes, right-angled isosceles reflecting prisms, each reflecting prism resting against a supporting part of the appertaining tube, this supporting part being an elevation touching the hypotenuse surface of the appertaining prism at that part which lies between the reflecting surfaces of the prism, and means pressing each prism against the appertaining elevation, these means acting only against that part of the prism which is adjacent to the line of intersection of the two reflecting surfaces.

3. A prismatic telescope, comprising two telescope tubes, right-angled isosceles reflecting prisms, each reflecting prism resting against a supporting part of the appertaining tube, this supporting part being an elevation which is represented by a vaulted surface and touches the hypotenuse surface of the appertaining prism at that part which lies between the reflecting surfaces of the prism, and means pressing each prism against the appertaining vaulted surface, these means acting only against that part of the prism which is adjacent to the line of intersection of the two reflecting surfaces.

4. A prismatic telescope, comprising two telescope tubes, right-angled isosceles reflecting prisms, each reflecting prism resting against a supporting part of the appertaining tube with its hypotenuse surface, the supporting part being an intermediate body placed between the tube and that part of the hypotenuse surface of the appertaining prism which lies in the middle between the reflecting surfaces of this prism, and means for pressing the prism against the tube, these means acting only against that part of the prism which is adjacent to the line of intersection of the two 1 flecting surfaces.

5. A prismatic telescope, comprising two telescope tubes, right-angled isosceles reflecting prisms, each reflecting prism having a recess in that part of its hypotenuse surface which lies in the middle between its two reflecting surfaces, each reflecting prism resting against a supporting part of the appertaining tube, this supporting part being an intermediate body carried by the tube and engaging the said recess, and means for pressing the prism against the tube, these means acting only against that part of the prism which is adjacent to the line of intersection of the two reflecting surfaces.

ERNST LANGENHAGEN.
ROBERT MECHAU.